CONVERTER CIRCUIT

Filed April 24, 1952

INVENTORS
Francis X. Beck &
Harold T. Bent, Jr.
BY H. L. Newton
ATTORNEY

Patented Oct. 6, 1953

2,654,836

UNITED STATES PATENT OFFICE 2,654,836

CONVERTER CIRCUIT

Francis X. Beck, Woodbury, and Harold T. Bent, Jr., Merchantville, N. J., assignors to Radio Corporation of America, a corporation of Delaware Application April 24, 1952, Serial No. 284,162

9 Claims. (Cl. 250—20)

Figure 1:
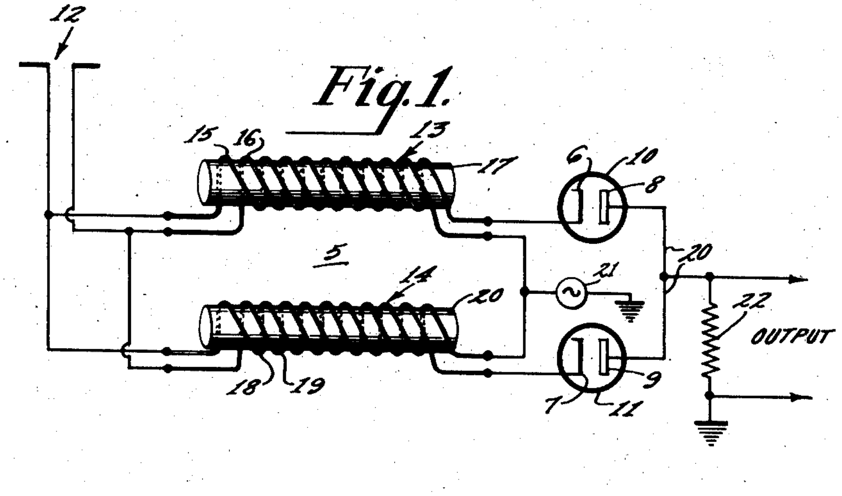

This invention relates to high frequency signal converters and mixing systems, and more particularly to converters and mixing systems of the bridge-circuit type capable of use between an antenna or signal source and a high frequency radio or television receiver, for preventing local oscillator radiation.

In very high frequency (V. H. F.) and ultra high frequency (U. H. F.) signal receivers such, for example, as television receivers, it is often necessary to apply both the received carrier wave and the local oscillator wave to the same pair of electrodes in the mixer tube or tubes. As a result, it is often found that appreciable amounts of local-oscillator power are radiated from the receiving antenna. This is undesirable because it creates objectionable interference with other neighboring receivers.

At lower radio frequencies up to perhaps 50 megacycles (mc.), it is known to use signal mixing circuits of the type referred to, which are essentially bridges, and which employ lumped circuit constants for canceling out local oscillator radiation, through the connected antenna or signal collector means. In such prior art circuits the input impedance of the mixer stage constitutes one arm of the bridge and an equivalent impedance element is employed as the balancing adjacent arm of the bridge. As a result, half of the signal power is consumed in the balancing impedance and only the remaining half is available across the mixer stage. Furthermore, at ultra high frequencies where the wavelength becomes comparable to the physical dimensions of the components, it is not practical to use lumped circuit elements such as conventional capacitors and wound inductors.

Accordingly, a general object of the present invention is to provide an improved, frequency-insensitive bridge circuit which is capable of passing energy of two frequencies while effectively insolating one of the sources of signal waves from the other.

A more specific object of the invention is to provide an improved mixer circuit for V. H. F. and U. H. F. signal receivers into which carrier waves and local oscillator waves may simultaneously be injected with no undesired radiation from the local oscillator.

Another object of the present invention is to provide a bridge-type mixer circuit wherein a proper impedance match is provided between at least one signal source and the frequency converting elements.

In accordance with the present invention, a pair of rectifiers are employed as signal mixers of V. H. F. or U. H. F. signals. The pair of rectifiers constitute a portion of adjacent arms of the mixer bridge circuit. The second pair of adjacent arms of the bridge are provided by either a pair of quarter wave length transmission lines when the bridge is employed to mix U. H. F. signal or by a pair of bifilar winding transformers when the bridge is employed to mix V. H. F. signals.

A proper impedance match between the antenna and the rectifier mixers is attained by connecting the transmission lines or transformers in parallel as seen from the antenna input terminals and in series as seen from the rectifiers.

Figure 2:
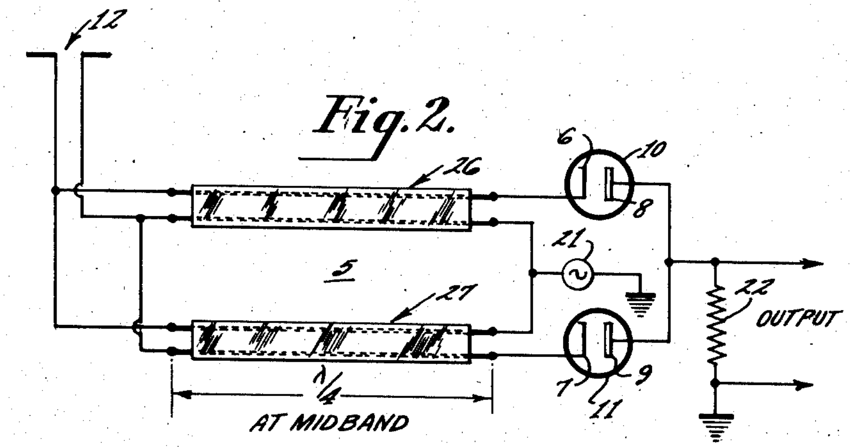
Figure 3:
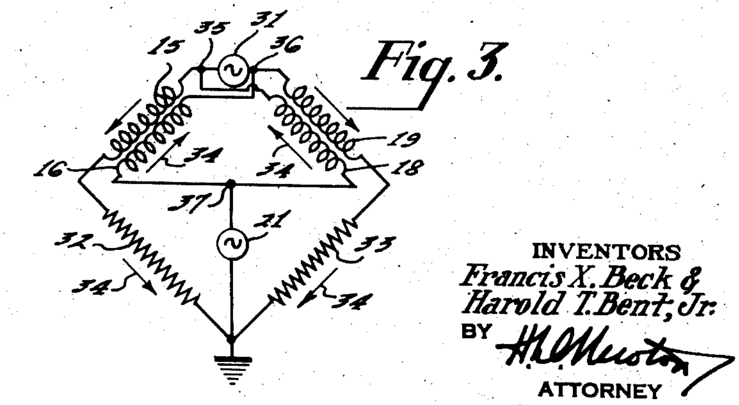

The novel features that are considered characteristic of this invention are set forth with particularity in the appended claims. The invention itself, however, both as to its organization, as well as additional objects and advantages thereof will best be understood from the following description when read in connection with the accompanying drawing, in which:

Figure 1 is a schematic circuit diagram of a mixer circuit in accordance with the present invention for use in a V. H. F. signal receiver;

Figure 2 is a schematic circuit diagram of a further embodiment of the present invention for use in a U. H. F. signal receiver; and Figure 3 is a schematic diagram of a bridge circuit which is electrically equivalent to the circuits of Figures 1 and 2.

Referring now to Figure 1, the bridge type mixer circuit 5 includes non-linear conducting devices or rectifiers 10 and 11 arranged in parallel relationship and connected to a source of high frequency modulated carrier waves represented by a dipole antenna 12 through a pair of coupling elements or impedance matching transformers 13 and 14. The rectifiers 10 and 11 may be, for example, separate germanium crystal rectifiers or diode vacuum tubes or may comprise a miniature twin diode vacuum tube of the 6AL5 type.

The transformer 13 includes a pair of single layer bifilar windings 15 and 16 positioned on a cylinder or coil form 17 of insulating material such, for example, as Bakelite. Similarly the transformer 14 includes a pair of single layer bifilar windings 18 and 19 positioned on coil form 20. Each of the windings, being symmetrically positioned on the coil forms, have more or less evenly distributed line constants and therefore provide artificial transmission lines having a predetermined characteristic impedance. As will hereinafter be more fully explained, the transformers 13 and 14 serve the dual purpose of matching the impedance of the antenna 12 to the impedance of the rectifiers 10 and 11 and of providing balanced arms in the bridge circuit of mixer 5 to effectively isolate the antenna 12 from the local oscillator of the mixer circuit.

To heterodyne the modulated carrier waves intercepted by antenna 12 to a predetermined intermediate frequency wave, there is provided a mixer wave source or local oscillator 21. One terminal of oscillator 21 is grounded and the other terminal is connected to electrodes 6 and 7 of the rectifier 10 and 11, respectively, by means of the transformers 13 and 14. The electrode 8 of rectifier 10 and the electrode 9 of rectifier 11 are connected to ground through a common connection or conductor 20 and a biasing resistor 22 to complete a direct current path for each rectifier. Carrier waves from the generator 12 and mixer waves from the oscillator 21 are heterodyned in the rectifiers 10 and 11 to produce waves of frequencies equal to the sum and difference of the carrier wave frequency and mixer wave frequency. The desired intermediate frequency wave may be selected by coupling to resistor 22 a frequency selective circuit which, not being a part of the invention, is not shown.

The embodiment of the invention as illustrated in Figure 1 is particularly applicable for use in a V. H. F. signal translating device such as a television receiver operating within the 54 to 216 mc. range.

Referring to Figure 2 a pair of quarter wave transmission lines or line sections 26 and 27 connect the antenna 12 and the oscillator 21 to the rectifiers 10 and 11 wherein the modulated carrier wave and the mixer waves are heterodyned. The transmission line sections 26 and 27 of Figure 2, therefore, replace the bifilar winding transformers 13 and 14 of Figure 1 and adapt the bridge type mixer 5 for employment in the U. H. F. range, such for example, as the tentatively allocated U. H. F. television range of 470 to 890 mc.

The transmission lines 26 and 27 each have a length approximately equal to a quarter wave length at the midband of the carrier wave frequency range and may be of either the coaxial line type or of the two wire parallel line type.

Reference is now made to Figure 3 which is the equivalent bridge circuit of both the V. H. F. embodiment of Figure 1 and the U. H. F. embodiment of Figure 2. The dipole antenna 12 is diagrammatically represented as a signal source 31. A load impedance or resistor 32 represents the impedance of rectifier 10 in series with the bias resistor 22 and a load impedance 33 represents the impedance of rectifier 11 in series with the bias resistor 22.

As hereinbefore stated, the transformers 13 and 14 serve a dual purpose, one of which is to match the impedance of the antenna to the antenna load impedance the latter of which mainly consists of the impedance of the rectifiers 10 and 11. As illustrated in Figure 3, the transformers 13 and 14 are connected in parallel as seen from the generator 31 and are connected in series as seen from either of the load impedances 32 or 33.

If, for example, the characteristic impedance of each of the transformers 13 and 14 is 150 ohms, it is apparent that by so connecting the transformers to the signal source 31 and the impedances 32 and 33, a proper impedance match between a generator impedance of 75 ohms, which is the approximate impedance of a dipole antenna, and a load impedance of 300 ohms, which is the approximate impedance of the rectifiers, may be attained. Similarly the quarter wave transmission line sections 26 and 27 of Figure 2 may be of the standard 150 ohm polyethylene, two wire type and thus be substituted for the transformers 13 and 14 to provide a proper impedance match at ultra high frequencies.

In addition to providing an impedance match between the generator 31 and the load impedances 32 and 33, the windings of the transformers 13 and 14 constitute the arms of a series circuit or of a balanced bridge circuit whereby the mixer waves developed by the local oscillator 21 are isolated from the carrier wave source 31 and prevented from radiating therefrom.

It is seen from Figure 3 that local oscillator currents represented by the arrows 34, pass through two parallel paths. One path includes in series relationship the winding 18, the winding 15, and the load impedance 32. The other path includes in series relationship the windings 16 and 19, and the load resistor 33. The carrier wave source 31 is connected in the bridge circuit at the points 35 and 36 which are equi-potential points in the local oscillator circuit. The potential difference between points 35 and 37 due to the voltage drop across the winding 18 is equal to the potential difference between the points 36 and 37 due to the voltage drop across the winding 16. Similarly the potential difference between the point 35 and ground is substantially equal to the potential difference between the point 36 and ground. Since points 35 and 36 are of equal potential for local oscillator currents, there is no flow of the oscillator currents between these points and therefore source 31 is effectively isolated from local oscillator 21.

The bridge-type mixer circuit for high frequency signal receivers and the like, in accordance with the invention provides as a presently preferred embodiment, means providing a source of modulated carrier waves and a source of mixer waves coupled to a pair of non-linear conducting devices by means of impedance matching elements in a manner whereby the mixer wave currents are prevented from flowing into the carrier wave source. In addition a proper impedance match is had between the carrier wave source and the non-linear devices to provide a mixer circuit of relatively high efficiency.

What is claimed is:

1. A bridge-type mixer circuit for high frequency signal receivers and the like, comprising in combination, a pair of two-conductor impedance-matching transformers; a pair of non-linear conducting devices; a first series circuit comprising a source of mixer waves, one conductor of each of said transformers and one of said non-linear devices; a second series circuit comprising said source, the other of said conductors of each of said transformers, and the other of said non-linear devices; and a source of modulated carrier waves connected across points of equal potential in said series circuits, whereby currents from said source of mixer waves are effectively isolated from said source of carrier waves.

2. In a bridge type mixer circuit, the combination as defined in claim 1, wherein said source of modulated carrier waves is a dipole antenna.

3. In a bridge type mixer circuit, the combination as defined in claim 1, wherein each of said impedance matching transformers is a parallel wire transmission line having a length equal to one-quarter of a wavelength at the mid-band of the carrier wave frequency range.

4. In a bridge-type mixer circuit, the combination as defined in claim 1, wherein each of said impedance matching transformers comprises a pair of single layer bifilar windings.

5. In a bridge type mixer circuit for high frequency signal waves, the combination with a supply source of carrier modulated waves; of a pair of two conductor impedance matching transformers connected in parallel across said supply source; a pair of rectifiers; a supply source of mixer waves; a first series circuit including said source of mixer waves, one conductor of each of said transformers, and one of said rectifiers; a second series circuit including said source of mixer waves, each of the other of said conductors, and the other of said rectifiers; and means connecting said first and said second series circuits in parallel relation.

6. In a high frequency radio receiver, a bridge type mixer circuit comprising in combination; an input circuit providing a source of modulated carrier waves; a first impedance matching transformer having two inductively coupled conductors; a second impedance matching transformer having two inductively coupled conductors; means connecting said transformers in parallel across said input circuit; a pair of non-linear conducting devices having at least two electrodes; means providing a direct connection between one pair of corresponding electrodes of said devices; a first series circuit comprising respectively one of said devices, one of said conductors of said first transformer, and one of said conductors of said second transformer; a second series circuit comprising the other of said devices, the other of said conductors of said second transformer, and the other of said conductors of said first transformer; means connecting said series circuits in shunt relationship, and means supplying a mixer wave across said series circuits.

7. In a high frequency radio receiver, the combination as defined in claim 6, wherein a biasing resistor is connected in circuit between said direct connection and said source of mixer waves.

8. In a high frequency radio receiver, the combination as defined in claim 6, wherein each of said impedance matching transformers is a parallel two wire transmission line having a length equal to one-quarter of a wavelength at the mid-band of the carrier wave frequency.

9. In a high frequency radio receiver, the combination as defined in claim 6, wherein each of said impedance matching transformers comprises a pair of single layer bifilar windings.

FRANCIS X. BECK.
HAROLD T. BENT, Jr.

References Cited in the file of this patent

UNITED STATES PATENTS

| Number | Name | Date |
|---|---|---|
| 2,591,982 | Van Weel | Apr. 8, 1952 |